(12) United States Patent
Doerr et al.

(10) Patent No.: US 8,757,207 B2
(45) Date of Patent: Jun. 24, 2014

(54) SOLENOID VALVE

(75) Inventors: Ralf Doerr, Ingelfingen (DE); Heiko Engler, Forchtenberg (DE); Martin Ottliczky, Forchtenberg (DE)

(73) Assignee: Buerkert Werke GmbH, Ingelfingen (DE)

( * ) Notice: Subject to any disclaimer, the term of this patent is extended or adjusted under 35 U.S.C. 154(b) by 168 days.

(21) Appl. No.: 13/411,338

(22) Filed: Mar. 2, 2012

(65) Prior Publication Data
US 2012/0223263 A1 Sep. 6, 2012

(30) Foreign Application Priority Data
Mar. 3, 2011 (DE) .................. 20 2011 003 472 U

(51) Int. Cl.
*F16K 11/052* (2006.01)
*F16K 11/078* (2006.01)
*F16K 31/10* (2006.01)

(52) U.S. Cl.
USPC .............. 137/625.44; 137/625.4; 251/129.02; 251/129.09

(58) Field of Classification Search
USPC ........ 137/625.4, 625.44; 251/129.01, 129.02, 251/129.03, 129.09
See application file for complete search history.

(56) References Cited

U.S. PATENT DOCUMENTS

| 365,438 A | * | 6/1887 | Jacobs | ............................ 236/84 |
| 2,570,450 A | * | 10/1951 | Hottenroth | ................. 251/129.2 |
| 2,633,871 A | | 4/1953 | Parsons | |
| 2,919,858 A | * | 1/1960 | Matthews | ..................... 236/1 H |
| 3,991,788 A | * | 11/1976 | Kull | ............................. 137/863 |

(Continued)

FOREIGN PATENT DOCUMENTS

DE 10 25 694 A 3/1958
DE 73 24 333 U 9/1973

(Continued)

OTHER PUBLICATIONS

German Patent and Trademark Office, Search Report for DE Pat. Appl. 20 2011 003 472.0, Jul. 14, 2011 (5 pages).

*Primary Examiner* — John K Fristoe, Jr.
*Assistant Examiner* — Frederick D Soski
(74) *Attorney, Agent, or Firm* — Steven McMahon Zeller; Dykema Gossett PLLC

(57) ABSTRACT

A solenoid valve comprising a particularly cuboidal housing having a hollow interior into which at least three flow channels open, at least two of which are formed with valve seats, is characterized in that at least two two-armed actuating elements are pivotally mounted in the hollow interior and each actuating element cooperates with at least one valve seat to cover or open the valve seat depending on its pivoted position.

19 Claims, 6 Drawing Sheets

(56) References Cited

U.S. PATENT DOCUMENTS

| | | | |
|---|---|---|---|
| 4,268,009 A * | 5/1981 | Allen, Jr. ............... 251/129.2 |
| 4,344,603 A * | 8/1982 | Hozumi et al. ......... 251/129.03 |
| 4,446,889 A * | 5/1984 | Sakakibara et al. ...... 137/625.4 |
| 4,527,590 A * | 7/1985 | Kolze ................. 137/596.17 |
| 4,561,632 A | 12/1985 | Hügler |
| 4,601,458 A * | 7/1986 | Sheppard ............. 251/129.19 |
| 4,765,370 A * | 8/1988 | Ariizumi et al. ........ 137/625.65 |
| 5,337,785 A | 8/1994 | Römer |
| 5,983,941 A | 11/1999 | Fritz et al. |
| 6,003,552 A | 12/1999 | Shank et al. |
| 6,394,136 B1 * | 5/2002 | Rohrbeck ............. 137/625.44 |
| 6,726,173 B2 * | 4/2004 | Hettinger et al. ....... 251/129.17 |
| 6,786,238 B2 * | 9/2004 | Frisch ................ 137/625.65 |
| 2003/0107018 A1 | 6/2003 | Hettinger et al. |
| 2010/0252760 A1 | 10/2010 | Hettinger |
| 2011/0140018 A1 | 6/2011 | Weiß |
| 2011/0155931 A1 | 6/2011 | Weiss |

FOREIGN PATENT DOCUMENTS

| | | |
|---|---|---|
| DE | 33 34 159 A1 | 4/1985 |
| DE | 42 22 594 A1 | 1/1994 |
| DE | 197 18 408 A1 | 5/1998 |
| DE | 201 00 471 U1 | 4/2001 |
| DE | 199 83 373 T5 | 7/2001 |
| DE | 20 2007 012 652 U1 | 12/2007 |
| DE | 20 2009 000 593 U1 | 4/2009 |
| DE | 10 2009 058 164 A1 | 6/2011 |
| DE | 10 2009 058 165 A1 | 6/2011 |
| DE | 10 2010 006 345 A1 | 8/2011 |
| EP | 0 578 168 A1 | 1/1994 |

* cited by examiner

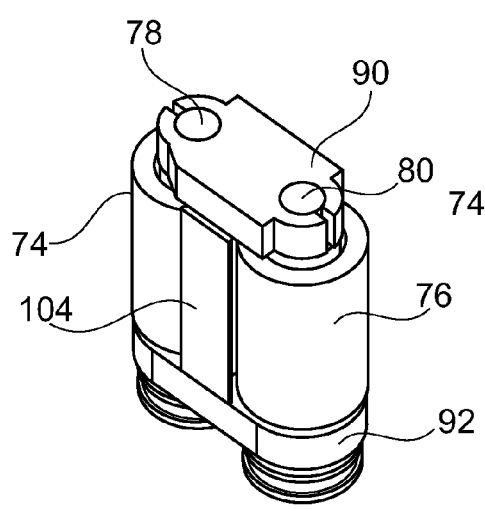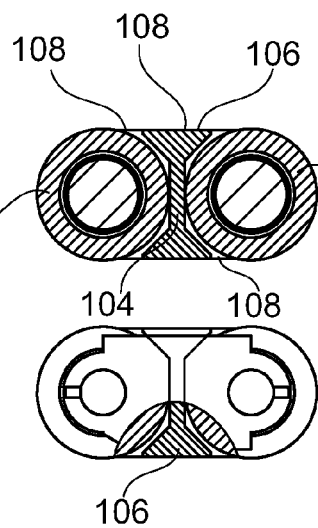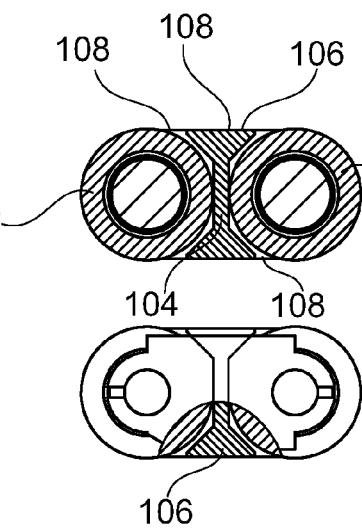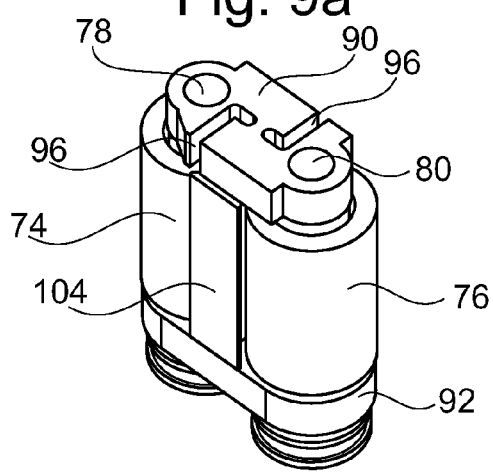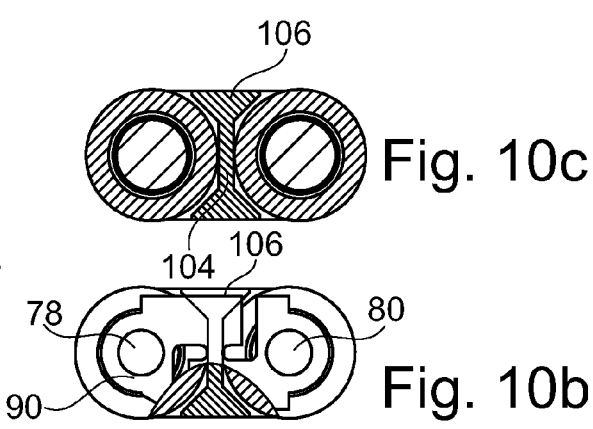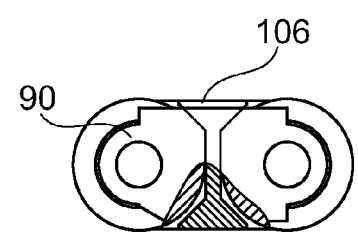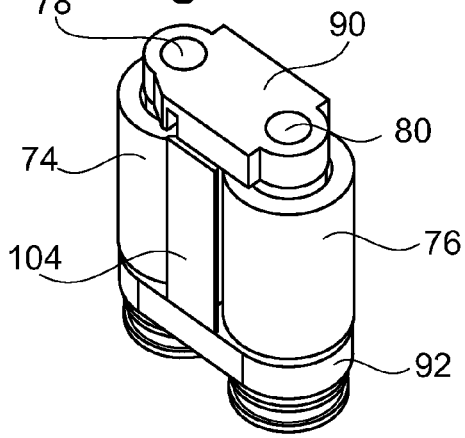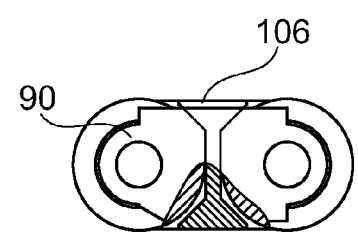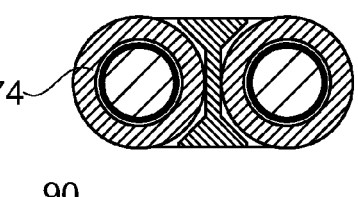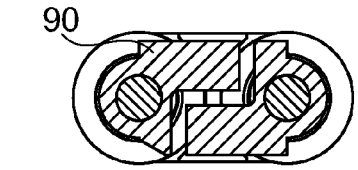

SOLENOID VALVE

CROSS REFERENCE TO RELATED APPLICATIONS

This application claims priority to German patent application 202011003472.0 filed 3 Mar. 2011. This German application is hereby incorporated by reference as though fully set forth herein.

TECHNICAL FIELD

The invention relates to a solenoid valve comprising a particularly cuboidal housing and a hollow interior into which at least three flow channels open of which at least two are formed with valve seats.

BACKGROUND OF THE INVENTION

Nowadays, solenoid valves have to be increasingly more efficient and in particular have to be configured increasingly more compact. Furthermore, they have to offer a fast response and switching characteristic.

The invention provides a compact solenoid valve having a simple construction.

BRIEF SUMMARY OF THE INVENTION

The solenoid valve according to the invention comprises a housing having a hollow interior into which at least three flow channels open, at least two of which are formed with valve seats, wherein at least two two-armed actuating elements are pivotally mounted in the hollow interior and wherein each actuating element cooperates with at least one valve seat to cover or open the valve seat depending on its pivoted position.

The solenoid valve according to the invention therefore has a very compact construction because several rocker-like actuating elements are accommodated in the hollow interior of the housing, which can open or close the valve seats. Few parts are furthermore necessary as the actuating elements are accommodated in a common housing. The invention relates in particular to a solenoid valve having several integrated 3/2 directional valves.

According to the preferred embodiment, the housing is in particular configured as an elongated parallelepiped.

In an embodiment, at least two actuating elements and three flow channels are arranged in a valve housing, two flow channels being formed as valve seats. Each actuating element cooperates with only one valve seat and can open or close the latter. Open valve seats are in fluidic communication with the third flow channel. Four switching conditions are therefore possible: both valve seats can be open, both valve seats can be closed, the first valve seat can be open and the second closed, and the second valve seat can be open and the first closed. This valve arrangement is in particular suitable for mixing fluids. In a valve having only one rocker-like actuating element cooperating with two valve seats, one respective valve seat is always open and the other one is at the same time closed. Mixing operations can therefore not be realized.

An intermediate wall arranged in the interior of the housing divides the hollow interior into several control chambers. At least one actuating element is accommodated in each control chamber.

A particularly compact embodiment can be achieved in that the intermediate wall runs diagonally in the interior of the housing such that in a top view, control chambers having a triangular basal face are produced. As used herein "diagonal" means a straight line connecting two vertices of a polyhedral figure that are not in the same face. Due to this triangular shape, the actuating element can extend along the longest branch of the triangle, which permits to save space. Longer lever arms are furthermore obtained, as a result of which smaller motive forces are required. The lever arm end thus describes a circle having a larger radius. This means that the deflection is approximately perpendicular and not heavily arched.

The diagonally extending intermediate wall also has a further advantage in connection with actuating elements extending along the diagonal intermediate wall. The armatures actuating the actuating elements and being arranged outside the housing may have axes which are parallel to the outer side of the housing and in particular intersect a central axis of the housing which is visible in a view in the coil longitudinal direction (axial direction) and is in particular parallel to the long side of the housing. As viewed in the longitudinal direction of the coils and of the armatures, the armatures along with their coils are thus arranged within the basal face defined by the housing and do not project laterally therefrom.

In a further embodiment, one actuating element and at least two flow channels should be provided in each control chamber, each actuating element being adapted to be brought into contact with at least one valve seat. This means that the actuating element can close one of two flow channels to form a 2/2 directional valve. This means that two 2/2 directional valves are accommodated in one valve housing.

In case three flow channels are provided in each control chamber, two of which are respectively formed as valve seats, two valves each having a 3/2-way function and being independent of each other are thus realized in one single valve housing.

The control chambers should be fluidically separated from each other such that the valves in each control chamber can be switched separately from and independently of each other. However, it would also be possible to provide an inflow or outflow channel as a common channel for both control chambers, which are then fluidically connected to each other. Two outflow or inflow channels are then present in each control chamber which can be switched independently of each other.

The return of the actuating element can be realized by a spring provided in each control chamber.

A fast return is achieved if the spring is arranged parallel to inflow-side or outflow-side flow channels provided in the wall of the housing.

One end of the spring should rest against a housing wall and the other end against the actuating element.

The preferred embodiment of the invention provides that a spring engages the actuating element at the end of an arm.

The housing wall and/or the actuating element should have retaining geometries for the spring such that the spring remains captively positioned within the housing. Such retaining geometries are in particular projections onto which the spring, which is usually configured as a helical spring, is slipped with a press-fit.

The pivotal mounting for the actuating element provides in particular a bearing pin the ends of which are respectively mounted in a housing wall. Theoretically, it is even possible to use a common bearing pin for both actuating elements. The bearing pin(s) is/are inserted from the outside into a bore in the housing. It is also advantageous if the inner ends of the bearing pins are mounted in the intermediate wall. The bearing locations in the housing walls are sealed.

The actuating elements may each have an engagement surface for an actuator on their side facing away from the valve seat. The actuator, usually an armature, thus so to speak presses on the back side against the actuating element to move it towards the associated valve seat.

The engagement surface can be configured as a web and/or have a semi-circular cross-sectional profile or, more generally speaking, a convex cross-sectional profile. This is advantageous to prevent, if possible, the occurrence of any sliding friction between the engaging actuator that is movable along an axis and the engagement surface that is movable on a circle. Rather, the convex surface leads to a rolling movement of the two parts.

In this connection, the central axis of the valve seat preferably intersects the longitudinal central axis of the web. This means that the force applied via the web is directly above the valve seat.

It is furthermore advantageous if in the closed position, the resultant of the actuating force applied to the engagement surface intersects the closing surface defined by the valve seat preferably in a perpendicular manner. The valve seat is usually a ring-shaped edge surrounding the mouth of a flow channel. This ring defines the closing surface which forms the interior of the outer periphery of the ring.

As mentioned, an armature-side force application occurs at the engagement surface by means of an actuator, an engagement surface being arranged eccentrically to the central axis of the armature. This permits to position the armatures relatively close next to each other such that the outer surface of the actuator, if possible, does not project from the outer periphery of the housing as viewed in the longitudinal direction of the armature. However, this embodiment further permits to configure the lever arms very long. In particular, the engagement surface should be closer to the end of the associated lever arm of the actuating element, i.e. further outside than the central axis of the armature.

An integrally formed bearing projection can be present at the actuating element. Additionally or alternatively, a closing surface for a valve seat is arranged at each arm of the actuating element. The pivoting axis of the actuating element is preferably positioned in the common plane defined by the closing surfaces.

The preferred embodiment provides that at least one actuating element has a longer and a shorter arm, in particular that both shorter arms of the two actuating elements point in opposite directions in the housing. In this way, even a point-symmetrical construction of the control chambers and of the actuating elements may possibly be obtained.

The actuating elements are in particular elongated bodies running parallel to each other.

In order to have as few different parts as possible, the actuating elements may be configured identically, i.e. have the same geometries and dimensions.

To provide a 3/2 directional valve, three flow channels having two valve seats open into each control chamber. This means that one flow channel always remains open, whereas the other two flow channels open in valve seats into the interior of the control chamber.

The valve seats may have a different geometry in each control chamber.

An elastic sealing element for covering or opening the associated valve seat may be fastened to the actuating element at least to one arm in the region of contact with the associated valve seat.

According to the preferred embodiment, for the lateral positioning of the actuating elements, wedge-shaped, inwardly directed guiding projections are integrally formed with the housing wall. In particular, one face of this wedge which faces the associated actuating element is arranged parallel to the opposite intermediate wall such that these two faces are parallel to each other and form lateral guiding surfaces.

For a simplified manufacture, the cuboidal housing should present an integrally formed bottom and integrally formed lateral walls and an open cover side. The housing thus consists of only two parts, i.e. the cover and the remaining housing.

The cover could also be integrated into the magnet drive so that no additional part is required.

The cover should have an opening for the passage of an armature-side actuator.

It is furthermore advantageous if at least one channel remote from the actuating element opens into the hollow interior so that the actuating element does not influence the flow to or from this channel.

The actuating elements should substantially be arranged in one plane, i.e. next to each other so that the valve seats are also substantially arranged in one plane. This makes the production of the solenoid valve easier. In particular, all valves seats may be present at one wall of the housing, the "wall" being also understood as bottom.

BRIEF DESCRIPTION OF THE DRAWINGS

FIGS. 9a to 9c are a perspective view, a top view and a sectional view, respectively, of a further embodiment of the magnetic drive which can be used in the invention.

FIGS. 10a to 10c are a perspective view, a top view and a sectional view, respectively, of a further embodiment of the magnetic drive which can be used in the invention.

FIGS. 11a to 11d are a perspective view, a top view and two sectional views at two different axial heights, respectively, of a further embodiment of the magnetic drive which can be used in the invention.

DETAILED DESCRIPTION OF PREFERRED EMBODIMENTS

Figure 1:
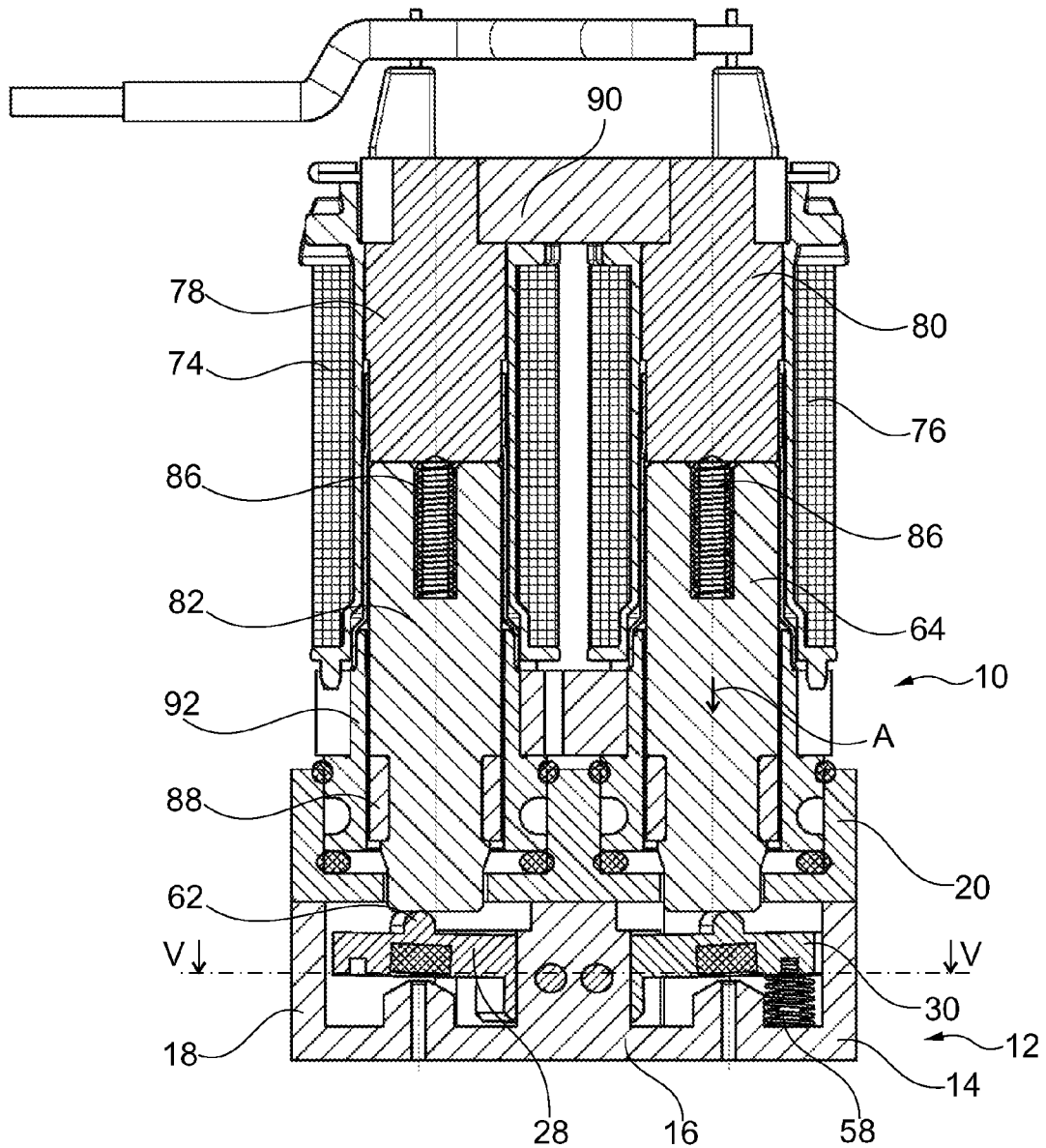
FIG. 1 is a longitudinal sectional view through a solenoid valve according to the invention.

The solenoid valve has an extremely small structure and is represented in an excessively large manner in FIG. 1. In practice, the solenoid valve according to the invention has a width of only about 7 to 10 mm.

The solenoid valve is configured as a double 3/2 directional valve in which both valves can be actuated independently of each other.

The actuating unit 12 comprises a preferably integral fluid housing 14 having a bottom 16 and a surrounding lateral wall 18. Towards the top, the housing 14 is closed by a cover 20 as part of the magnetic drive 10. The interior of the housing 14 can be taken most easily from FIG. 2. An intermediate wall 22 integrally adjoining the bottom 16 and the lateral wall 18 extends diagonally through the cuboidal housing 14.

The intermediate wall 22 divides the hollow interior of the housing 14 into two control chambers 24, 26 which are preferably, but not necessarily fluidically separated from each other and which are each associated with a 3/2 directional valve. Alternatively, more than two 3/2 directional valves can also be accommodated in one housing 14.

Figure 3:
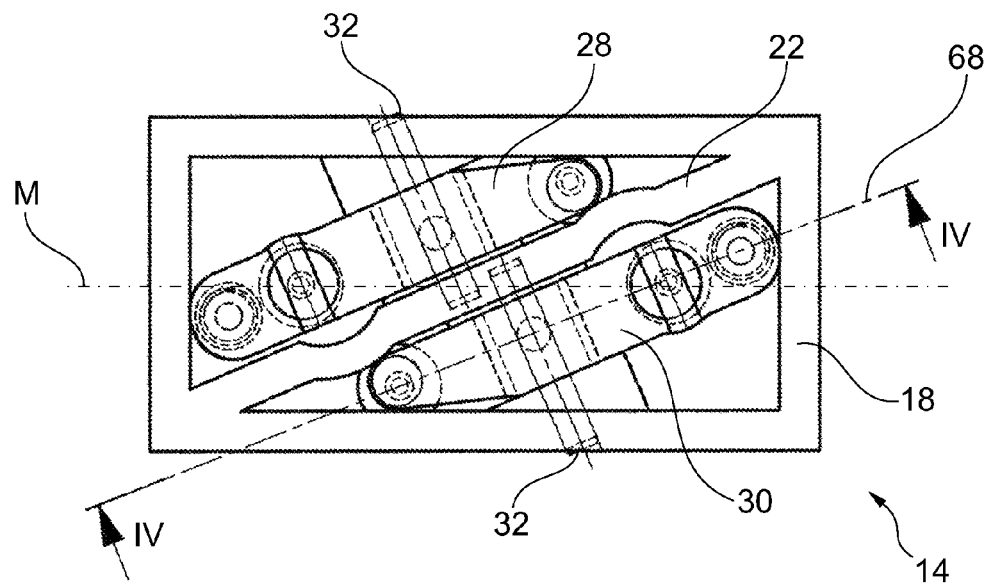
FIG. 3 is a top view onto the valve housing shown in FIG. 2, the valve drive being removed.

Two valve bodies, hereinafter referred to as actuating elements 28 and 30, respectively, are entirely accommodated in the control chambers 24, 26. The actuating elements 28, 30 are two-armed levers (see FIG. 4) which are each mounted in the housing 14 via a bearing pin 32 the imaginary center of which forms the pivoting axis. The pins 32 are pressed from the outside into bores in the lateral wall 18 and in the intermediate wall 22, as can be seen in FIGS. 3 and 5. The pins 32 run parallel or coaxially to each other. In the example embodiment represented, they are parallel.

Figure 4:
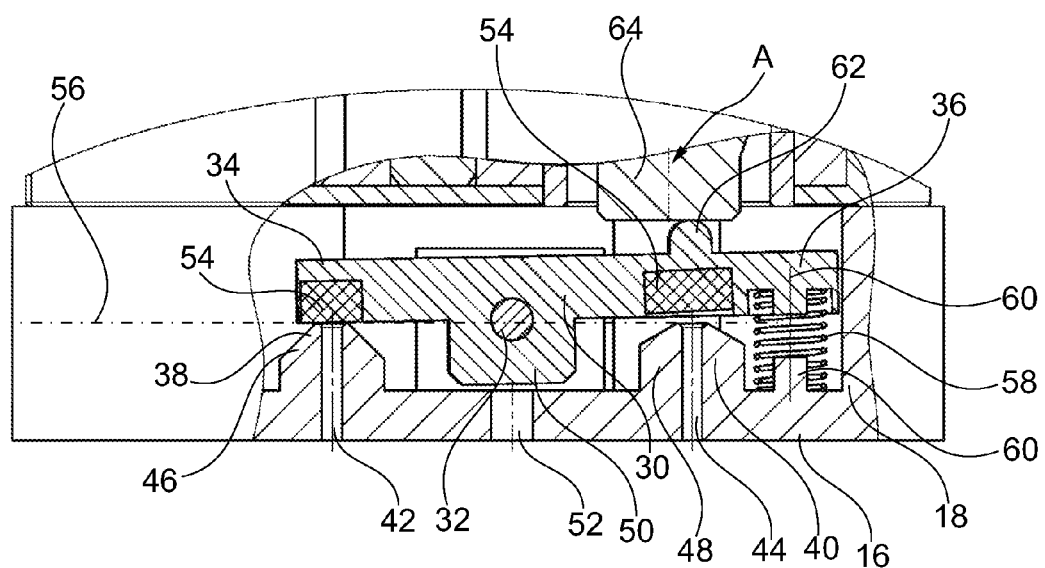
FIG. 4 is an enlarged view of the housing shown in FIG. 3 along the line IV-IV.
Figure 5:
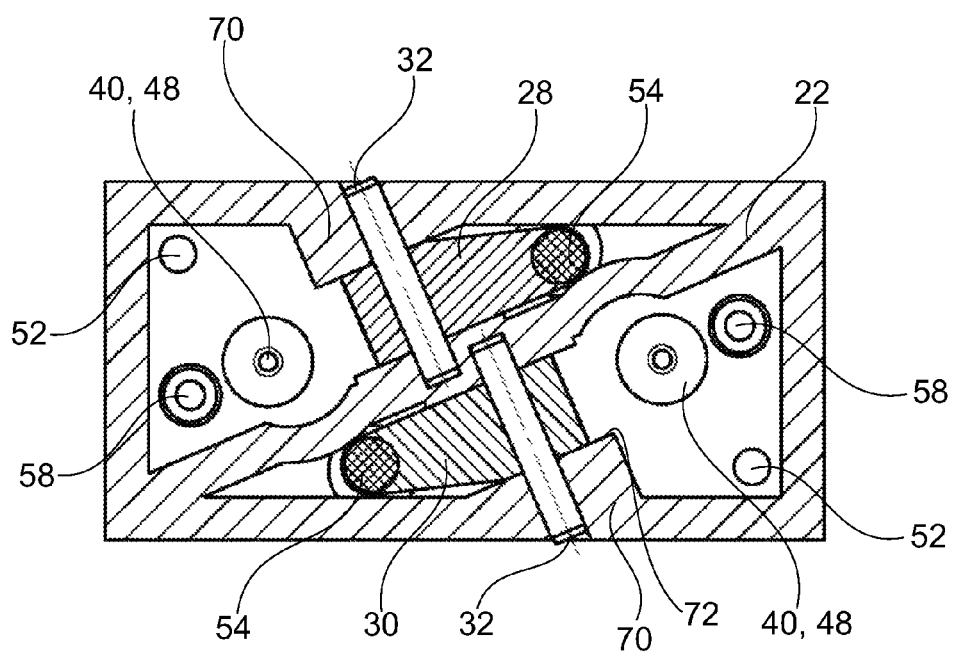
FIG. 5 is a sectional view through the solenoid valve along the line V-V in FIG. 1.

In FIG. 4 it can be seen that the lever arms 34, 36 have different lengths.

Each actuating element 28, 30 cooperates with two valve seats 38, 40 associated with flow channels 42, 44 which open into the control chamber 24 or 26. Cone-shaped projections 46, 48 extend from the bottom 16 towards the actuating element 28, 30. The flow channels 42, 44 which open at the top of the respective projections 46, 48 extend coaxially through the projections 46, 48. Around the mouth, the projection 46, 48 is provided with a ring-shaped surface which forms the valve seat 38 and 40, respectively.

In the embodiment shown, the distances of the two valve seats 38, 40 from the imaginary pivoting axis of the bearing pin 32 are equal but could also be different.

For a better stability of the actuating element 30 in the region of the bearing pin 32, the actuating element 30 presents a projection 50 which is also referred to as bearing lug. The same applies to the actuating element 28.

FIG. 4 also shows a flow channel 52 which is however preferably remote from the actuating element 28, 30, as shown in FIG. 5.

Each control chamber 24, 26 thus has a total of three flow channels opening therein, namely the flow channels 42, 44, 52. Two of these three flow channels, namely flow channels 42, 44, can be closed by the actuating element 28 or 30.

The rocker-like actuating element 30 has on its face associated with the valve seats 38, 40 one respective sealing element 54 made of elastomer which provides for an increased sealing when the actuating element 28, 30 rests against the valve seat 38 or 40. The two valve seats 38, 40 define a common plane 56 in which the central axis of the bearing pin 32 should also be arranged (see FIG. 4). This is however merely an advantageous option.

The two actuating elements 28, 30 preferably have an identical shape, they are merely mounted in their respective control chambers 24, 26 rotated through 180°.

The actuating elements 28, 30 are elongated, bar-like bodies which extend in particular parallel to the intermediate wall 22 over nearly the entire diagonal length of the control chambers 24, 26.

A spring 58 is mounted between the longer lever arm 36, more precisely between its free axial end and the bottom 16, the spring biasing the actuating element 30 anticlockwise and pressing the latter against the valve seat 38 with respect to FIG. 4.

For a better support of the spring 58, both the lever arm 36 and the bottom 16 are provided with retaining geometries 60 which constitute pin-like projections.

On the face opposite to the valve seats 38, 40, the actuating element 28, 30 has an engagement surface 62 which has a semi-circular cross-section and is in particular configured in the form of a web. This is clearly visible in FIG. 2.

When the flow channel 44 is closed, the engagement surface 62 is positioned exactly above the valve seat 40, i.e. the corresponding faces are oriented to each other.

The engagement surface 62 is important for the low-friction contact with an actuator in the form of a movable magnetic core 64 of the magnetic drive 10. The magnetic core 64 has on the side of the end face a plane counter-contact surface via which it can rest against the engagement surface 62.

Alternatively, the two contact surfaces can however also be configured such that the engagement surface 62 at the actuating element 28, 30 is configured in a plane manner and the end face of the magnetic core 64, 82 has a hemispherical geometry.

The magnetic core 64 is movable in a longitudinal or axial direction A (see FIG. 1).

The spring 58 is also oriented in this axial direction A. Furthermore, the flow channels 42, 44 extend in the axial direction A.

Figure 2:
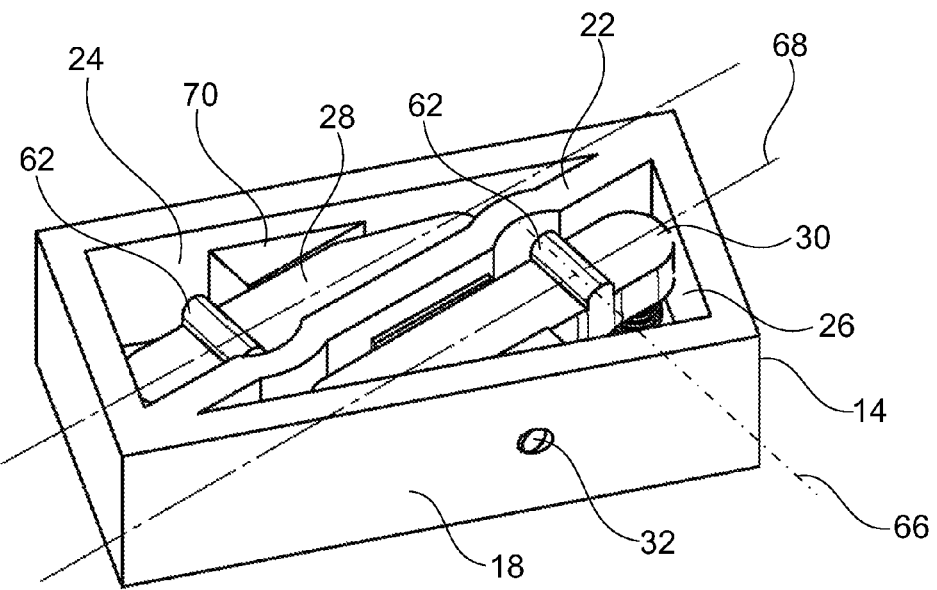
FIG. 2 is a perspective view of the solenoid valve with the drive removed.

The orientation of the web-like engagement surface 62 with respect to the imaginary central axis of the flow channel 44 is preferably realized such that the central axis of the flow channel 44 and thus also the central axis of the valve seat 40 intersects the longitudinal central axis 66 of the web shown in FIG. 2, and this with respect to the closed valve position at the flow channel 44.

In more general terms, in the closed position, the resultant of the actuating force through the magnetic core 64 acting on the engagement surface 62 should intersect the so-called closing surface perpendicularly. The closing surface is defined by the outer periphery of the ring-shaped valve seat 40 and defines in turn a circular area which is referred to as closing surface.

As can furthermore be seen in FIGS. 1 and 4, the engagement surface 62 is offset to the central axis of the magnetic core 64 so that the magnetic core 64 is positioned further inside in order to realize a higher compactness of the magnetic drive 10. The contact between the engagement surface 62 and the lower end face of the magnetic core 64 is arranged closer to the free end of the lever arm 36 with respect to the central axis of the magnetic core 64.

Further characteristics of the actuating unit 12 are its low height with respect to the axial direction A. This low height is obtained by the parallel arrangement of the actuating elements 28, 30 which are substantially placed in one plane. This means that with respect to the axial direction A, they are not arranged one on top of the other but next to each other, as can be seen in FIG. 1. The pivoting axes of the bearing pins 32 are thus preferably arranged in a common plane which is perpendicular to the axial direction A.

The simple mounting and the secure support of the actuating elements 28, 30 are also improved by the mounting of the actuating elements 28, 30 in the longitudinal direction of the bearing pins 32, because integrally formed wedge-shaped and inwardly pointing guiding projections 70 having a guiding surface 72 project from opposite walls 18 (see FIG. 5), the guiding surface extending parallel to the opposite face of the intermediate wall 22.

The actuating elements 28, 30 are thus mounted between opposite guiding surfaces so as to be secured against an axial displacement.

The magnetic drive 10 which is represented in FIG. 1 is a pre-mounted self-contained unit which after its mounting and completion is put on the actuating unit 12 that is also configured as a pre-mounted unit.

The magnetic drive 10 comprises two parallel coils 74, 76 each surrounding a magnetic plug 78, 80 at their end opposite to the actuating unit 12. Axially movable armatures, hereinafter referred to as magnetic cores 82, 64, are also accommodated in the interior of the coils 74, 76 and are biased by springs 86 towards the actuating unit 12 opposite to the respective magnetic plug 78, 80. The magnetic cores 82, 64 project through openings in the cover 20 into the interior of the housing 14 and press in the initial position against the convex engagement surfaces 62 of their respective actuating element 28 or 30. However, in the initial position, when the coil 74, 76 is not supplied with current, the respective actuating element 28, 30 is pivoted such that it is removed from the valve seat 40 and rests on the valve seat 38 as the springs 58 are configured so as to be weaker than the springs 86.

Reference number 88 refers to a sliding element which counteracts frictional forces possibly occurring upon movement of the magnetic cores 82, 64 within the sleeves surrounding them.

FIG. 1 also shows that the magnetic drive 10 also has a very compact structure. As viewed in the axial direction A, it does not project on any face from the basal face of the housing 14.

The two coils 74, 76 can be actuated independently of each other, which means that the two 3/2 directional valves formed by the actuating elements 28, 30 can also be actuated independently of each other. This independent actuation is possible due to the fact that each drive has its own ferromagnetic circuit, the two ferromagnetic circuits being substantially decoupled from each other. This decoupling is obtained although the two magnetic plugs 78, 80 protruding at the top out of the coils 74, 76 are received in a common yoke plate 90. A common yoke plate 92 provided at the opposite end of the coils 74, 76 is furthermore present so that the yoke plates 90, 92 delimit the two parallel coils 74, 76 in the axial direction.

FIGS. 6 to 14 represent different possibilities how two ferromagnetic circuits are formed which substantially do not influence each other despite the two common yokes 90, 92.

Figures 6A, 6B:
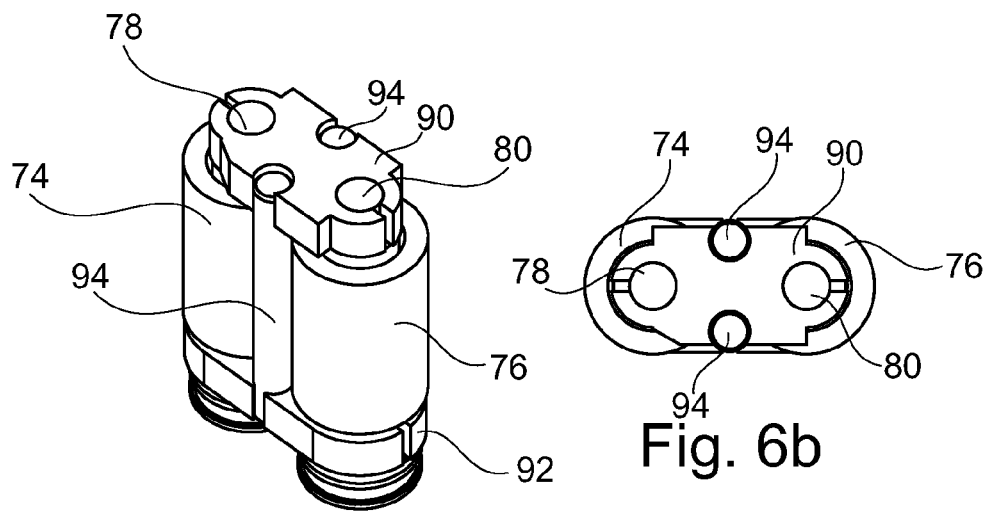
FIGS. 6a and 6b are a perspective view and a top view, respectively, of a possible variant of the magnetic drive which can be used in the solenoid valve according to the invention.

In the embodiment according to FIG. 6a, two magnetic elements in the form of two parallel yoke bolts 94 are provided which extend parallel to the coils 74, 76 and therebetween. As can be seen in FIG. 6b, the yoke bolts 94 are arranged within the common envelope of the two coils 74, 76 and do not project to the top and to the bottom, i.e. do not project laterally with respect to FIG. 6b. The two yoke bolts 94 are magnetic and project into recesses in the two yoke plates 90, 92 to be received and fastened therein. The yoke bolts 94, along with the coils 74, 76 and the magnetic plugs 78, 80, form two ferromagnetic circuits. The stray fields of each ferromagnetic circuit are very small such that the adjacent ferromagnetic circuit remains functionally uninfluenced.

Figures 7A, 7B:
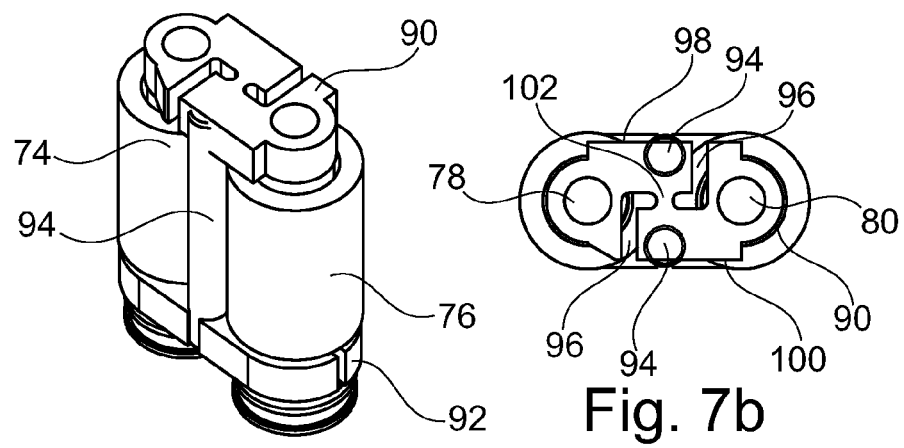
FIGS. 7a and 7b are a perspective view and a top view, respectively, of a further embodiment of the magnetic drive.

An even better decoupling of the ferromagnetic circuits is obtained by the embodiment of FIG. 7. Corresponding yoke bolts 94 are also provided here. At least the upper yoke plate 90, preferably both yoke plates 90, 92 however present gaps 96 each starting from opposite longitudinal edges 98, 100 of the yoke plates 90, 92, extending towards the opposite longitudinal edge 100 and 98, respectively, and then approaching each other without merging into each other. The gaps 96 extend from their longitudinal edges 98, 100 not exactly opposite towards each other but are laterally offset to each other so that they are always associated with a yoke bolt 94 and are arranged between the associated yoke bolt 94 and a magnetic plug 78 or 80. A gap 96 thus magnetically decouples a yoke bolt from the magnetic plug 78 and the other gap 96 the magnetic plug 80 from the other yoke bolt 94. The upper yoke bolt 94 in FIG. 7b is thus magnetically associated with the magnetic plug 78, and the lower yoke bolt 94 with the magnetic plug 80 in order to each form a respective ferromagnetic circuit. Though a narrow connecting web 102 between the gaps 96 forms a kind of bridge, the latter is so narrow that no significant influence of the two ferromagnetic circuits occurs via this bridge and the two drives can act separately from each other.

The connecting web 102 permits the configuration of the yoke plates 90, 92 in one piece which simplifies their mounting. In case of two-part yoke plates, an additional adjustment step is required for aligning the parts with each other.

For the embodiments according to FIGS. 6 to 7 and for the remaining embodiments according to FIGS. 8 to 14, it can be advantageous to configure the yoke plates 90, 92 as sheet stacks, which means that the yoke plates 90, 92 are made of several layers of thin metal sheets. For the sake of simplicity, these metal sheets can be stamped as stacks.

Figures 8A, 8B, 8C:
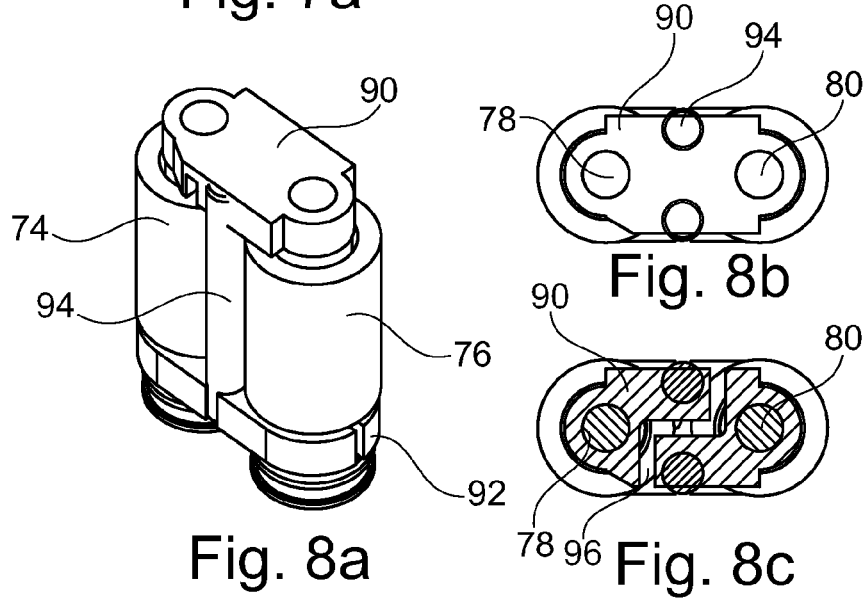
FIGS. 8a to 8c are a perspective view, a top view and a sectional view, respectively, of a further embodiment of the magnetic drive which can be used in the invention.

Whereas the L-shaped gaps 96 in FIG. 7a run axially entirely through the yoke plates 90, 92, it is provided in the embodiment of FIG. 8 that the upper layer of the multilayered yoke plate 90 or 92 is configured without gaps (see FIG. 8b), whereas the underlying layers have a completely continuous gap 96 which is also configured without connecting web 102, such that the two ferromagnetic circuits are completely separated from each other in the lower layers. The upper layer is in particular made of a non ferritic material to not form any magnetic bridge.

In the embodiments according to FIGS. 9 to 14, a magnetic element in the form of a magnetic plate 104 which extends between the coils 74, 76 (see for example FIG. 9c) is provided for separating the ferromagnetic circuits, rather than two yoke bolts. The magnetic plate 104 extends axially between the yoke plates 90, 92 and is in contact therewith. The coils 74, 76 can also contact, for example clamp the magnetic plate 104 at their narrowest location, wherein the insulating lacquer for insulating the coil wire must not be damaged.

The magnetic plate 104 presents wedge-shaped, thickened longitudinal edges as viewed in the axial direction A. These longitudinal edges have reference number 106. The wedge-shaped longitudinal edges 106 extend over the entire length of the magnetic plate 104 in the axial direction A of the coils 74, 76 and substantially fill the space between the outer envelope 108 of the coils 74, 76 and the coils 74, 76 resulting from the circular cylinder outer surface thereof.

In the embodiment according to FIG. 9, the yoke plates 90, 92 are not slotted.

In the embodiment according to FIG. 10a, the yoke plates 90, 92 of FIG. 7 are however used with appropriate gaps 96 such that in this connection, reference can be made to the explanations as to FIG. 7.

In the embodiment according to FIG. 11, the yoke plates 90, 92 of FIG. 8 are used in connection with the magnetic plate 104. No separate explanations are necessary here, either.

Figure 12A:
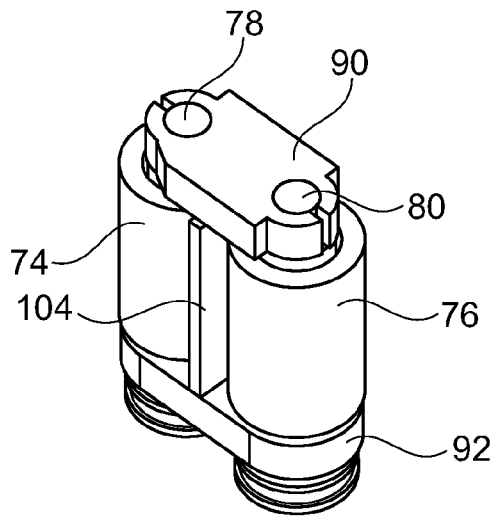
FIGS. 12a and 12b are a perspective view and a top view, respectively, of a further embodiment of the magnetic drive which can be used in the invention.
Figure 12B:
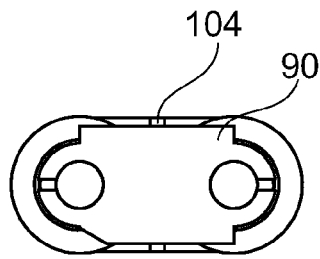

In the embodiment according to FIG. 12, the magnetic plate 104 is configured without thickened longitudinal edges but merely in a rectangular way. The yoke plates 90, 92 correspond to those of the embodiments according to FIG. 6.

Figure 13A:
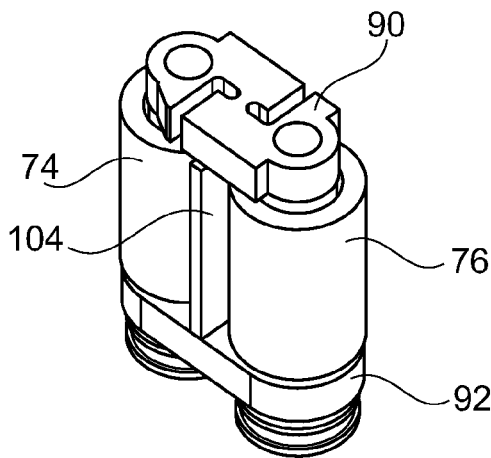
FIGS. 13a and 13b are a perspective view and a top view, respectively, of a further embodiment of the magnetic drive which can be used in the invention.
Figure 13B:
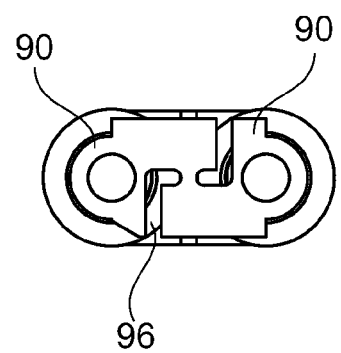

The embodiment of FIG. 13 combines the magnetic plate 104 of FIG. 12 with the yoke plates 90, 92 of FIGS. 7 and 10.

Figure 14A:
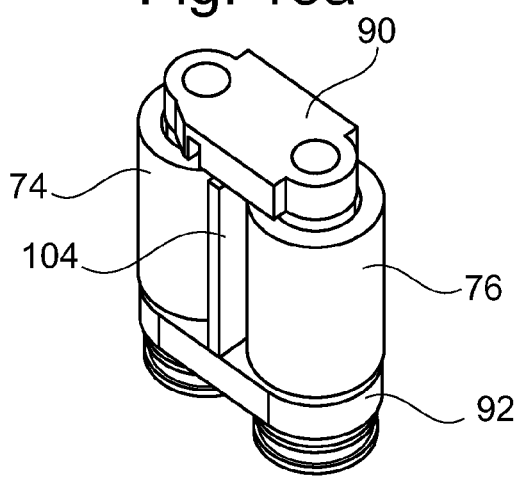
FIGS. 14a to 14c are a perspective view, a top view and a sectional view, respectively, of a further embodiment of the magnetic drive which can be used in the invention.
Figure 14B:
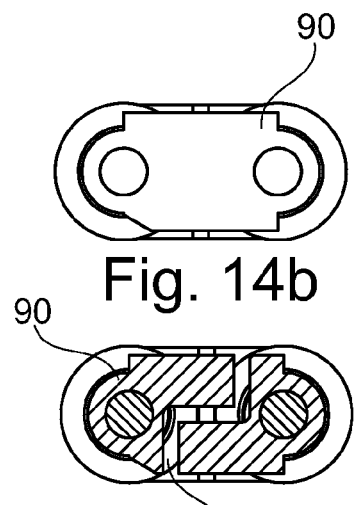
Figure 14C:
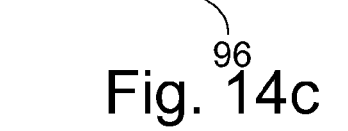

The embodiment of FIG. 14 combines the magnetic plate 104 of FIG. 12 with the yoke plates 90, 92 of FIGS. 8 and 11.

The magnetic drives 10 shown in the figures have laterally a very small structure and thus not protrude from the basal face of the bottom 16 of the housing 12. As viewed in the axial direction A, the coils 74, 76 with their central axes are placed on the central axis M of the longitudinal housing 14, see FIG. 3. It can be seen that only the diagonal arrangement of the actuating elements 28, 30 permits the positioning of the coils 74, 76 on this central axis M to simultaneously obtain a compact construction.

The valve shown is preferably a pneumatic valve having two 3/2 directional valves.

The long lever arms on the rocker-like actuating elements 28, 30 permit the accommodation of the return springs 58.

During normal operation, a medium, for example air, is applied under pressure below the seat 40. The channel 42 which has a ventilating function in pneumatic valves is fluidically connected with the flow channel 52, the so-called working connection. Upon actuation of the associated coil 76, the valve seat 40 is opened by the spring 58 and the valve seat 38 is simultaneously closed. In this switching position of the solenoid valve, the channel 44 is fluidically connected with the flow channel 52.

However, in case the channel 42 is to be opened, the coil 76 is supplied with current, the magnetic core 82 or 64 is moved to the actuating element 28, 30, the actuating element 28, 30 pivots clockwise according to FIG. 4 and is lifted off from the valve seat 38. Due to the small magnetic influence of the two drives, the drive of a control chamber 24, 26 can be actuated independently of that of the other control chamber 26 or 24, respectively.

The diagonal arrangement of the actuating elements 28, 30 results in long lever arms and in small transverse movements, which improves the fluidic performance. The valve seats 40 arranged below the magnetic cores 82, 84 ensure a direct power transmission.

What is claimed is:

1. A solenoid valve comprising a housing having a hollow interior into which at least three flow channels open, at least two of which are formed with valve seats, wherein at least two two-armed actuating elements are pivotally mounted in the hollow interior and wherein each actuating element cooperates with at least one valve seat to cover or open the at least one valve seat depending on its pivoted position, wherein at least one intermediate wall dividing the hollow interior into two control chambers is arranged in the interior of the housing, and wherein the at least one intermediate wall extends diagonally through the hollow interior.

2. A solenoid valve comprising a housing having a hollow interior into which at least three flow channels open, at least two of which are formed with valve seats, wherein at least two two-armed actuating elements are pivotally mounted in the hollow interior and wherein each actuating element cooperates with at least one valve seat to cover or open the at least one valve seat depending on its pivoted position, wherein the at least two actuating elements have a longer and a shorter lever arm and wherein the two shorter lever arms of the at least two actuating elements each point in opposite directions in the housing.

3. The solenoid valve according to claim 2, wherein the actuating elements each have an engagement surface for an actuator on their side facing away from the at least one valve seat, the engagement surface having a convex cross-sectional profile and being configured as a web.

4. The solenoid valve according to claim 3, wherein the at least one valve seat has a central axis, and wherein the central axis of the valve seat intersects a longitudinal central axis through the web.

5. The solenoid valve according to claim 3, wherein the valve seat defines a closing surface, and wherein, in the closed position of the valve seat, a resultant of an actuating force applied to the engagement surface intersects the closing surface.

6. The solenoid valve according to claim 3, wherein a movable armature is provided, and wherein the moveable armature applies a force at the engagement surface, the engagement surface being positioned eccentrically to the central axis of the associated armature.

7. A solenoid valve comprising a housing having a hollow interior into which at least three flow channels open, at least two of which are formed with valve seats, wherein at least two two-armed actuating elements are pivotally mounted in the hollow interior and wherein each actuating element cooperates with at least one valve seat to cover or open the at least one valve seat depending on its pivoted position, wherein a closing surface for the at least one valve seat is present at each lever arm of the at least two actuating elements, and wherein the pivoting axis of the at least two actuating elements are arranged in a common plane defined by the valve seats.

8. The solenoid valve according to claim 7, wherein the housing has a housing wall, and wherein the actuating elements each have a bearing pin, the ends of the bearing pin are mounted in the housing wall.

9. The solenoid valve according to claim 7, wherein a bearing projection is provided on each of the at least two actuating elements.

10. The solenoid valve according to claim 7, wherein at least one of the at least two actuating elements has a longer and a shorter lever arm.

11. The solenoid valve according to claim 7, wherein the actuating elements are elongated bodies which run parallel to each other.

12. The solenoid valve according to claim 7, wherein the actuating elements are identical.

13. The solenoid valve according to claim 7, wherein three flow channels open into each control chamber, and wherein two flow channels have valve seats in their control chamber.

14. The solenoid valve according to claim 7, wherein at least one intermediate wall dividing the hollow interior into two control chambers is arranged in the interior of the housing.

15. The solenoid valve according to claim 14, wherein the actuating elements have bearing pins, wherein one end of the bearing pins is mounted in the at least one intermediate wall.

16. The solenoid valve according to claim 14, wherein the actuating elements have a longitudinal extension and, with respect to their longitudinal extension, extend parallel to the at least one intermediate wall.

17. The solenoid valve according to claim 14, wherein one actuating element and at least two flow channels are provided in each control chamber, each actuating element being adapted to be brought into contact with the at least one valve seat.

18. The solenoid valve according to claim 14, wherein a spring for returning each actuating element is accommodated in each control chamber.

19. The solenoid valve according to claim 18, wherein the at least three flow channels have inflow-side and outflow-side channels, wherein the housing has a housing wall, wherein the inflow-side or outflow-side flow channels are provided in the housing wall, and wherein each spring is arranged parallel to one of the inflow-side and outflow-side flow channels and/or wherein an end of each spring rests against the housing wall and wherein another end of each spring rests against one of the at least two actuating elements.

\* \* \* \* \*